July 11, 1967 W. T. WILLIS 3,330,576
DEVICE FOR HANDLING EATING UTENSILS
Filed July 30, 1965 3 Sheets-Sheet 1

INVENTOR.
WILLIAM T. WILLIS
BY
ATTORNEYS

July 11, 1967  W. T. WILLIS  3,330,576
DEVICE FOR HANDLING EATING UTENSILS
Filed July 30, 1965  3 Sheets-Sheet 2

INVENTOR.
WILLIAM T. WILLIS
BY
ATTORNEYS

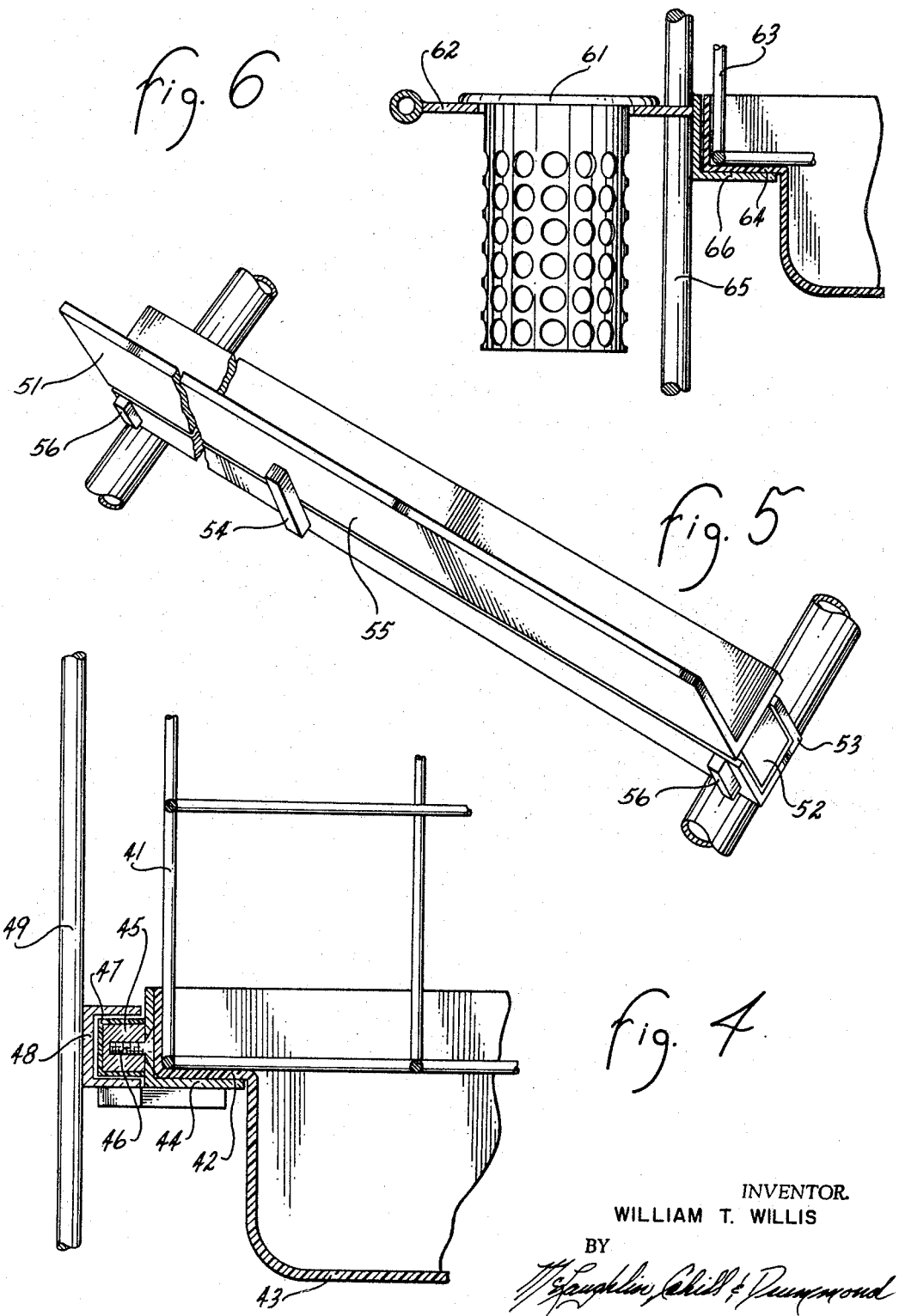

United States Patent Office 3,330,576
Patented July 11, 1967

3,330,576
DEVICE FOR HANDLING EATING UTENSILS
William T. Willis, 3240 E. Oak,
Phoenix, Ariz. 85008
Filed July 30, 1965, Ser. No. 476,028
1 Claim. (Cl. 280—79.3)

This invention relates to novel apparatus for handling soiled eating utensils such as plates, cups, saucers, glasses, silverware and the like. In a particular aspect the invention concerns apparatus for collecting soiled eating utensils from the dining table and transporting them to a dishwashing machine with a minimum of handling and rearrangement preparatory to machine dishwashing.

Nearly all restaurants, eating establishments, hotels and the like are equipped with machine dishwashers, commonly of the type wherein the soiled eating utensils are first segregated into their various categories such as plates, cups, saucers, glasses, silverware and the like and each category is then received in and held in its proper position for machine dishwashing in an open-mesh basket, typically a basket made of wire which is covered with a suitable coating such as rubber or resilient plastic. This basket containing a category of eating utensils is then inserted into the machine where the utensils are washed and dried, followed by removal of the basket and cleaned eating utensils from the machine and stacking or storage of the cleaned utensils until they are used again.

Commonly, the soiled eating utensils together with table scraps are removed from the dining table into a cart commonly called a busboy cart which consists essentially of a frame with wheels and one or more deep trays to receive the soiled utensils and refuse. These trays are then transported by the cart to the machine dishwashing station where the utensils are separated from the table scraps and inserted into the proper type of basket for insertion into the dishwashing machine. The extra handling of the soiled utensils involved in removing them from the busboy cart and placing them in the proper arrangement in the dishwasher basket commonly induces a certain amount of breakage, requires additional manpower, and, very frequently, involves the loss of small items such as silverware which are often inadvertently discarded along with the refuse.

It would be highly advantageous if the sorting of the soiled utensils, the separation thereof from the table refuse and the stacking of each category in the dishwashing machine basket could be accomplished as the soiled utensils are removed from the dining table, thereby reducing to a minimum the number of times the utensils must be handled before washing and, concomitantly, reducing the danger of accidental breakage and loss of small utensils such as silverware through inadvertent commingling with the refuse.

Accordingly, it is an object of the present invention to provide an assembly whereby the soiled utensils can be sorted and placed in the proper stacked relationship for machine dishwashing and simultaneously separated from refuse in a single operation conducted at the locus of the dining table;

Another object of the invention is the provision of an apparatus whereby the sorted, properly stacked utensils separated from the refuse can be easily and conveniently transported to the machine dishwashing station without further handling of the individual utensils;

Yet another object of the invention is the provision of means for quickly and conveniently separating the soiled eating utensils from refuse;

Other, further and more specific objects of the invention will become readily apparent to persons skilled in the art from a consideration of the following description, taken in conjunction with the drawings wherein specifically preferred embodiments of the invention are shown and exemplified.

FIG. 4 is a detail sectional view taken along line 4—4 of FIG. 2, further illustrating the sliding mechanism;

FIG. 5 illustrates a mechanism for preventing accidentally removing the entire sliding mechanism when a tray-basket set is removed from the cart;

FIG. 6 is a detail section taken along line 6—6 of FIG. 1 showing the handle mechanism, the silverware holder, and the stacking arrangement for the top-most basket-tray set.

Figure 1:
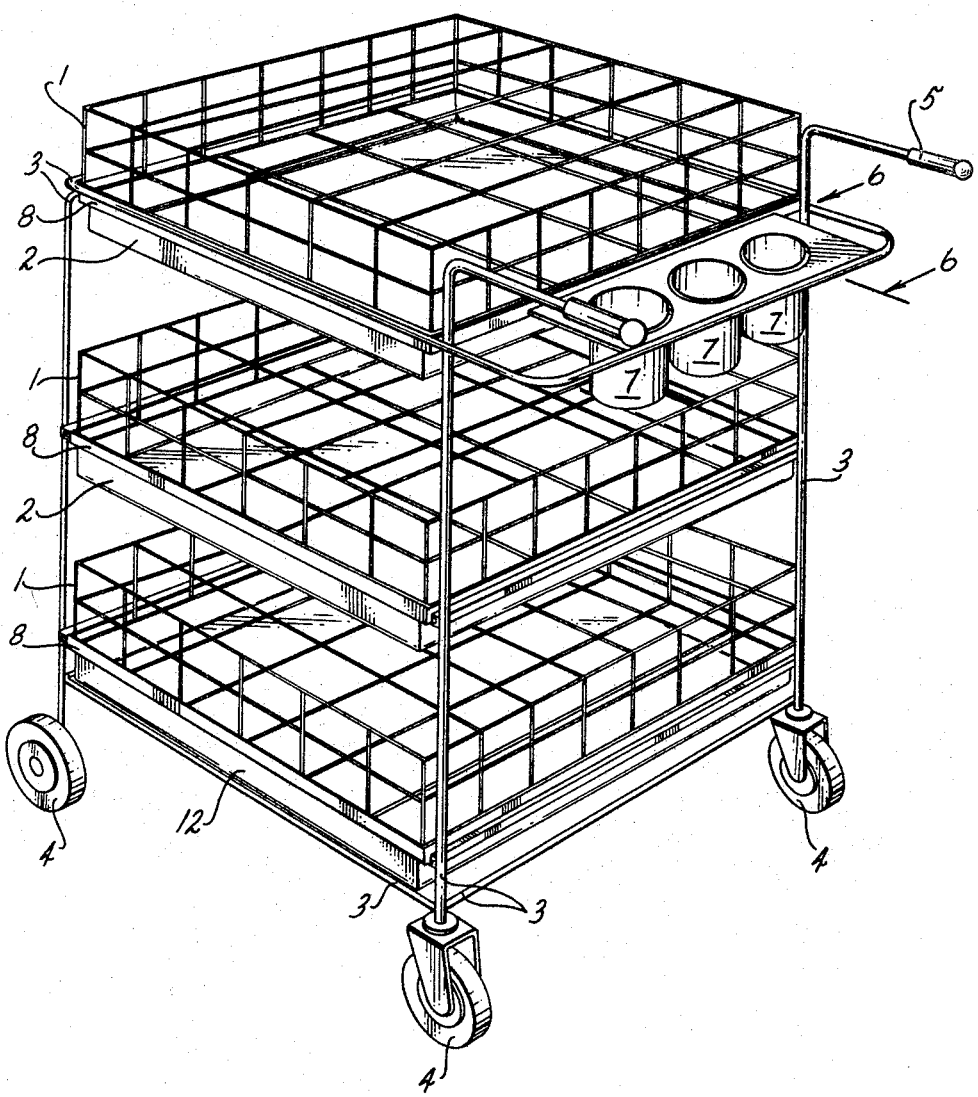
FIG. 1 is a perspective view of a preferred embodiment of the invention chosen for purposes of illustration showing generally the arrangement of the machine dishwashing baskets and associated refuse collecting trays in stacked relation in the cart frame.

As shown in the embodiment chosen for illustration in FIG. 1, the open-mesh baskets generally indicated by reference No. 1 and their associated refuse collecting trays, generally indicated by reference No. 2 are received and held in vertically stacked registry by the frame of the cart, generally indicated by reference No. 3, which is advantageously provided with wheels 4 and a suitable handle assembly 5. The receptacles for silverware 7 may be attached at any suitable place on the cart, advantageously as shown in FIG. 1 at the rear thereof at a convenient height for easy access. The cart is conveniently constructed of tubular metal members 3 comprising the frame and is suitably provided with angle members 8 which receive the flared edges of the basket-tray set.

Figure 2:
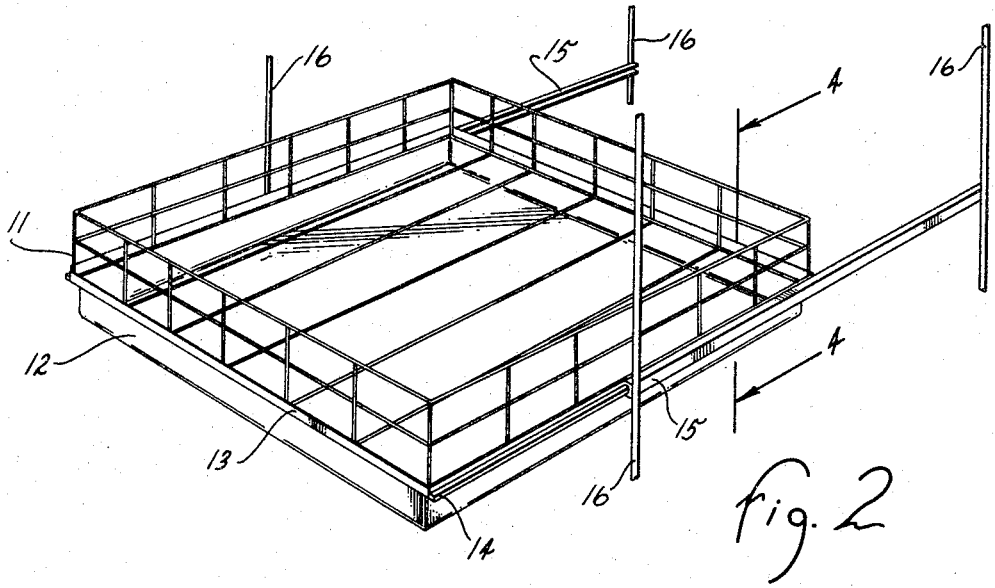
FIG. 2 is a partial perspective view showing the sliding mechanism associated with one of the basket-tray pairs.

To provide easy access to the lower most baskets for loading and to permit easy removal of the loaded baskets, all baskets and trays except the top most set are slidably received in the cart frame. A preferred means of providing slidable engagements between the basket-tray sets and the frame is shown in FIG. 2. The basket 11 and tray 12 are received in a slidable frame 13 having a projecting lip 14 which is received in a channel member 15 forming part of the frame of the cart along with the tubular members 16.

Figure 3:
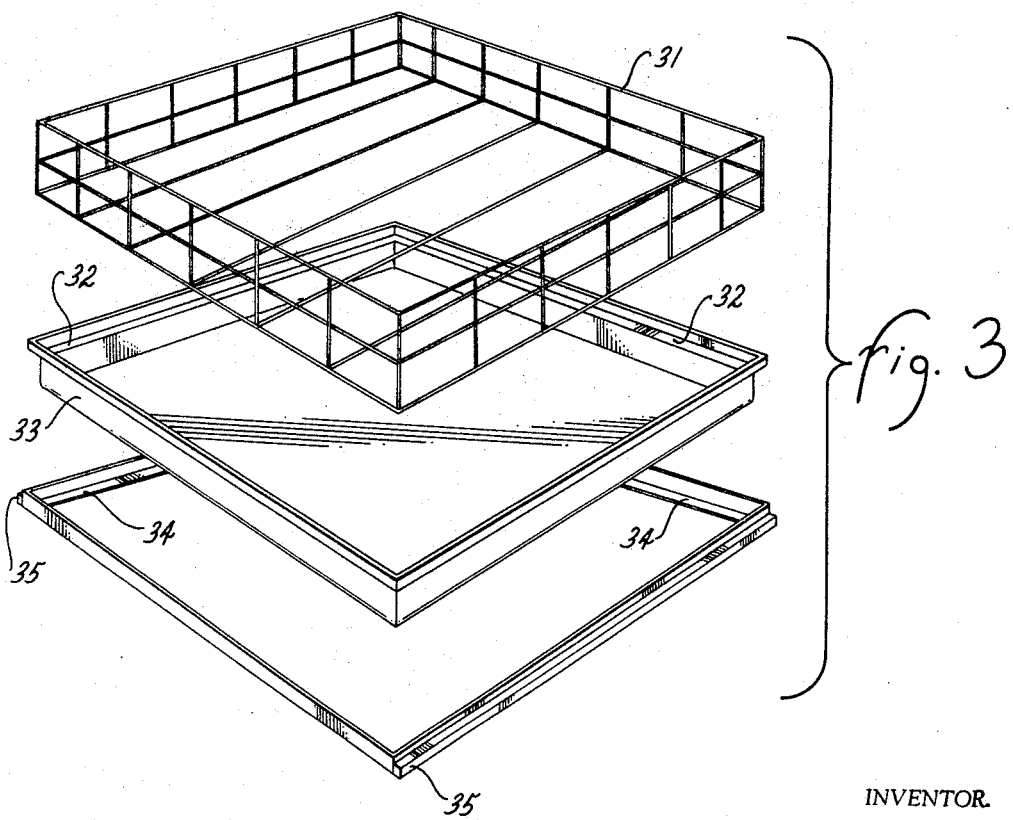
FIG. 3 is an exploded perspective view showing the operative relationship of a basket-tray set and the sliding frame member.

The basket-refuse tray-sliding frame assembly is shown in exploded view in FIG. 3. The basket 31 is received in the flared seat 32 of the refuse tray 33. The basket-refuse tray combination is then seated in the angle member 34 having a projecting lip 35 which operates in the channel member 15 of FIG. 2.

The assembly of the basket, refuse tray and slidable frame member is shown in more detail in FIG. 4. The basket 41 seats in the flared portion 42 of the refuse tray 43, which, in turn, seats and is retained in the angle member 44 of the slidable frame. The lip of the slidable frame is formed by a bar 45 attached to the angle member, such as by means of a machine screw 46. The bar is preferably provided with coating 47 of a friction reducing substance such as Teflon plastic. The lip operates in a channel member 48 which can be welded directly to the tubular frame 49 of the cart.

FIG. 5 is a perspective view of the sliding frame 51, the lip 52 being slidably received in the channel 53. The slidable frame is provided with a stop member 54 attached to the angle bracket portion 55 to limit sideways movement of the sliding member when the stop member 54 contacts the keepers 56 attached to the channel member of the cart frame. In this manner the slidable member can be moved sideways to either side of the cart allowing ready access for inserting soiled utensils and for removing the basket and tray.

FIG. 6 is a cross section taken along line 6—6 of FIG. 1 showing the means for suspending silverware containers 61 from a frame portion 62 extending rearwardly from the cart. As shown in FIG. 6 the uppermost basket 63 and refuse tray 64 need not be slidably received in the cart frame 65, but may be merely seated in an angle member 66, since, being uppermost, the basket may be loaded with soiled utensils and the basket and refuse tray may be easily removed from the cart frame without sliding them to one side or the other.

The refuse trays may be fabricated of metal or suitable plastic such as fiberglass reinforced resins. It is to be emphasized that the exact proportions of the baskets and refuse trays are not highly critical since the exact construction of the open-mesh baskets used in different dishwashing machines will vary somewhat. Rather, it is only necessary that the baskets, of whatever proportion and shape be received and held in the cart frame in vertically stacked registry with the refuse tray, whereby the refuse falling from the soiled utensils can be directed into and retained by the refuse tray. In operation, the cart is loaded with empty baskets and trays and wheeled to the dining table. The soiled utensils and refuse are removed from the table, at the same time being segregated into the various categories required for machine dishwashing such as plates, cups and saucers, glasses, silverware, etc. In the loading of the baskets one or more of the slidable basket-refuse tray sets may be moved sideways from the cart to permit easy stacking of the utensils in the baskets. When loaded, the cart is then wheeled to the machine dishwashing station where the baskets are removed and inserted directly into the dishwashing machine. The refuse trays may be then removed from the cart, the refuse dumped into suitable containers, or into a garbage disposal unit as the case may be, after which they are rinsed and returned to the cart.

It will be noted that the apparatus provides means for moving the soiled utensils from the table to the dishwashing machine with only one handling of the soiled utensils and with reduced opportunities for breakage and reduced chances of inadvertently discarding small utensils along with the refuse.

The invention has been described with particular reference to a portable busboy cart. However, as will be obvious to those skilled in the art, the same type of apparatus can be employed to advantage in a stationary installation such as would be advantageous for clearing lunch counters and the like. The apparatus involved in such a stationary installation would be substantially the same as the busboy cart except, of course, the wheels and handles would be omitted.

Although the invention has been described by reference to a presently preferred embodiment chosen for illustration, it is to be understood that the invention is not limited to the details shown thereby but only by the scope of the claim appended hereto.

Having described my invention and the presently preferred embodiments thereof, I claim:

A busboy cart for collecting soiled eating utensils, sorting them into categories suitable for machine dishwashing and of transporting the sorted utensils to a machine dishwasher, comprising:

(a) a plurality of open-mesh baskets, each including transverse partitions which divide said baskets into compartments for holding categories of soiled eating utensils in position for machine dishwashing and shaped to be inserted directly into a dishwashing machine;

(b) a refuse tray operatively engaged with each of said open-mesh baskets, said tray having a flared edge adapted to receive the bottom of said open-mesh basket, said tray receiving refuse falling through the open mesh of the basket when said basket is seated in said flared edge of said refuse tray;

(c) slidable frame members having a peripheral seat portion shaped to receive the flared edges of said refuse trays;

(d) a frame which supports sets of said baskets and trays by means of respective pairs of horizontal channel members engaging said slidable frame members;

(e) wheels attached to said frame in floor engaging position.

References Cited
UNITED STATES PATENTS

| | | | |
|---|---|---|---|
| 774,445 | 11/1904 | Moore | 280—79.2 |
| 860,822 | 7/1907 | Pitcher | 312—336 X |
| 1,171,486 | 2/1916 | Warner | 280—79.3 X |
| 1,562,089 | 11/1925 | Holley | 280—79.2 X |
| 2,937,765 | 5/1960 | Shank | 308—3.6 X |

BENJAMIN HERSH, *Primary Examiner.*

C. C. PARSONS, *Assistant Examiner.*